United States Patent
Anlauff (10) Patent No.: US 6,903,927 B2
(45) Date of Patent: Jun. 7, 2005

(54) CONVERTIBLE MOBILE COMPUTING DEVICE

(75) Inventor: Marcus Anlauff, Braunschweig (DE)

(73) Assignee: Nokia Corporation, Espoo (FI)

( * ) Notice: Subject to any disclaimer, the term of this patent is extended or adjusted under 35 U.S.C. 154(b) by 95 days.

(21) Appl. No.: 10/322,784

(22) Filed: Dec. 17, 2002

(65) Prior Publication Data

US 2004/0114315 A1 Jun. 17, 2004

(51) Int. Cl.$^7$ ................................. G06F 1/16
(52) U.S. Cl. .................. 361/681; 361/683; 345/169; 341/22
(58) Field of Search .................. 361/681, 683, 361/686, 687, 682, 679; 312/223.1, 223.2; 348/794; 248/917–923; 345/169, 905; 40/530; 400/689, 682, 641, 693; 455/90, 575

(56) References Cited

U.S. PATENT DOCUMENTS

| | | | | |
|---|---|---|---|---|
| 4,960,256 A | * | 10/1990 | Chihara et al. | 248/286.1 |
| 5,085,394 A | * | 2/1992 | Torii | 248/455 |
| 5,168,426 A | * | 12/1992 | Hoving et al. | 361/681 |
| 5,200,913 A | * | 4/1993 | Hawkins et al. | 361/681 |
| 5,209,448 A | * | 5/1993 | Hatanaka et al. | 248/455 |
| 5,255,214 A | * | 10/1993 | Ma | 361/680 |
| 5,267,123 A | * | 11/1993 | Boothroyd et al. | 361/681 |
| 5,410,447 A | * | 4/1995 | Miyagawa et al. | 361/681 |
| 5,646,818 A | * | 7/1997 | Hahn | 361/681 |
| 6,243,819 B1 | | 6/2001 | Jung | |
| 6,430,038 B1 | * | 8/2002 | Helot et al. | 361/681 |
| 6,464,195 B1 | * | 10/2002 | Hildebrandt | 248/460 |
| 6,504,707 B2 | * | 1/2003 | Agata et al. | 361/681 |
| 6,636,419 B2 | * | 10/2003 | Duarte | 361/680 |
| 6,654,234 B2 | * | 11/2003 | Landry et al. | 361/681 |
| 2003/0109230 A1 | * | 6/2003 | Duarte et al. | 455/90 |

FOREIGN PATENT DOCUMENTS

EP 0626632 8/2000

* cited by examiner

Primary Examiner—Michael Datskovskiy
(74) Attorney, Agent, or Firm—Ware, Fressola, Van Der Sluys & Adolphson LLP (57) ABSTRACT

A convertible mobile computing device has a display screen and cover supported at three points for stable movement between a closed position, a laptop PC operational position and a tablet PC operational position. A web hinge assembly pivotally couples along a folding axis on the cover side of the display screen and to the rear marginal edge of the base unit with which the display screen cooperates. The cover further includes means for pivotal and slideable engagement with guides at either side of the base unit wherein the lower portion of the display screen travels forward into a tablet operational position with the display screen facing substantially upward in a flat orientation for writing and viewing. The web hinge assembly nests within a recess portion of the cover and the base unit when the device is in the tablet operational position wherein the cover is in face-to-face relation with a keyboard carried on the base unit operational surface and when in the closed position wherein the display screen is in face-to-face relation with the keyboard to provide a slender profile.

22 Claims, 8 Drawing Sheets

CONVERTIBLE MOBILE COMPUTING DEVICE

BACKGROUND OF THE INVENTION

Technical Field

The present invention relates generally to portable electronic devices and particularly deals with re-configurable enclosures or cases carrying the device to enable and accommodate different operational modes. More specifically, the present invention deals with a portable electronic device having a display screen transformable between multiple operational configurations and a closed configuration. More particularly, the present invention deals with a convertible mobile computing device having a base and a display screen transformable between a laptop or notebook PC keyboard operational configuration and a webpad or tablet PC operational configuration and a closed or transport configuration.

Mobile computing devices such as personal digital assistants (PDA), notebook and laptop personal computers (PCs) have become increasingly popular due to their portability and increased functionality. In many instances, these devices have a base unit, which may contain a keyboard for ease of data entry and a cover with a display panel hinged to the base unit for viewing images, graphics and text. The cover is typically arranged for movement about and transverse to an axis at the intersection of the base unit and the display screen. The range of tilting movement of the display is limited in the vertical direction about the axis of rotation and accordingly a limited freedom of movement of the display with respect to the base unit.

There have been numerous attempts to provide an increased freedom of movement of the display with respect to the base unit. EP 0 626 632 B1 discloses a three position information processing apparatus wherein the display screen is moveable from a closed position to a predetermined angle with respect to the keyboard for key input and a nearly flat position above the keyboard for pen input. One problem with the apparatus is the display screen is only supported at two points and is cantilevered with respect to the keyboard base unit when moved from position to position. A further disadvantage is the display screen does not lie flat when placed in the pen input position.

Figure 1:
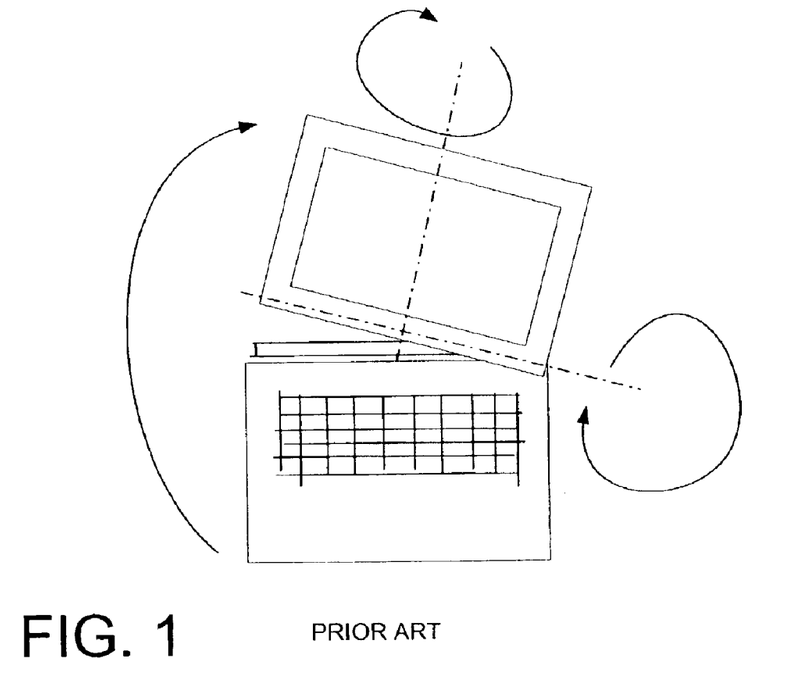
FIG. 1 is a schematic representation of a prior art mobile computing device.

In another prior art device as illustrated in FIG. 1, the display is connected to the base unit at only one support point for horizontal rotation about a transverse axis to the base unit from and to its closed position. The display is supported at the same single support point and is arranged for vertical rotation about an axis substantially perpendicular with respect to the plane of the base unit to rotate the display 180° as the display screen faces rearward and then rotated again about the transverse axis to allow movement into a tablet-like position with the display screen facing upward. Such a representative device is for example, embodied in a mini-laptop computer produced by Samsung. There are a number of mechanical deficiencies and limitations associated with such a design. The display is limited in size due to the single support point of connection at the horizontal and vertical rotation axes and thus screen size is limited. In addition, difficulties arise in the wiring between the base unit and the display screen portion due to twisting of the wiring harness.

Figure 2:
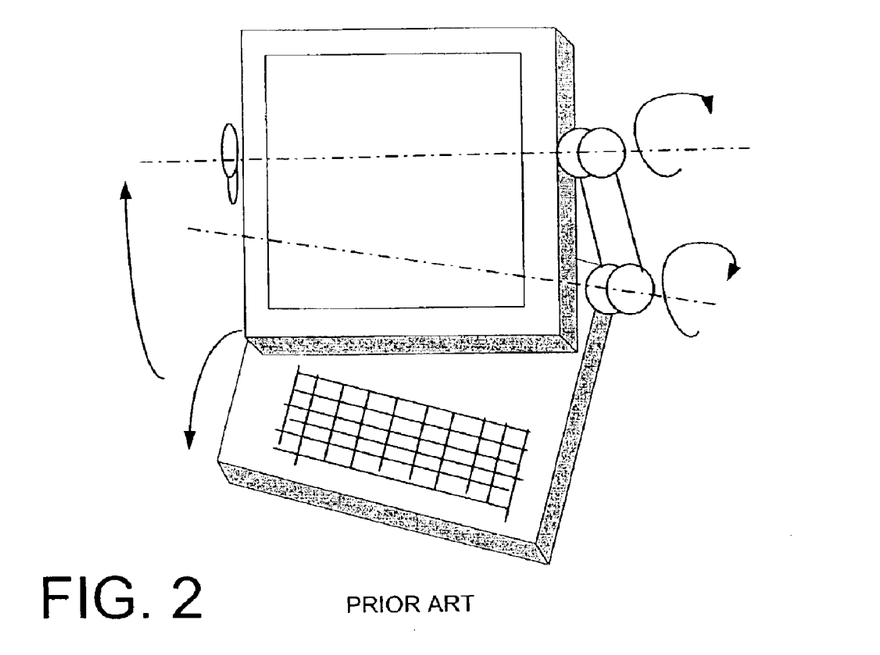
FIG. 2 is a schematic representation of a further prior art mobile computing device.

A further attempt at increasing the freedom of movement of the display with respect to the base unit is illustrated in the prior art device illustrated in FIG. 2 which utilizes arms having a rotatable connection at both sides of the display and both sides of the base unit. The display can rotate about the arms and the arms can rotate with respect to the base to permit the display to move between a keyboard position and a tablet-like position. The mechanical arrangement of the display screen with respect to the base is less than desirable because the display screen is only attached at two points and therefore is susceptible to twisting and skewing as the display screen is moved between its desired positions. In addition, difficulties arise in the wiring harness since it is continually twisted during rotation of the display screen with respect to the display rotation axis and with respect to the base rotation axis. The Mobilon mobile computing device manufactured by Sharp, for example, embodies such a representative design.

Another prior art convertible device is the Acer Travel/Mate which looks like a conventional notebook PC with the display screen supported between its lower portion and a base unit for tilting with respect to the base unit by means of a center hinge movable about two axes substantially perpendicular to one another and spring-loaded screen support ears at either side corner of the base unit to support the lower end portions of the display screen for tilting. The spring loaded screen support ears are pulled away from the screen display base by a releasable mechanism to free the display for turning via the center hinge to which it is attached and then folded toward the base unit so the display screen faces upward in the tablet PC position. The display screen of the unit is supported at one position only during its movement from the notebook PC position to the tablet PC position. The display screen of the Acer device moves in a path in a similar manner as the display screen of the prior art device illustrated in FIG. 1. A further disadvantage is the device cannot be converted between positions using one hand only because the spring-loaded support ears must be released to free the display for turning.

Another convertible mobile computing device is available from Toshiba and has its display screen coupled to a base unit in a similar manner as the Samsung device and the prior art device shown in FIG. 1 for movement from its notebook PC position to its tablet PC position.

Another major disadvantage generally associated with prior art convertible portable electronic devices such as the prior art convertible mobile computing devices as described above is the display text/graphics must be rotated or turned 180° when the device is converted from its notebook PC position to its tablet PC position otherwise the text/graphics are viewed upside down. The re-orientation of the text/graphics is software intensive and often requires user or operator intervention to activate or select the desired orientation.

It would be desirable therefore to provide a convertible mobile computing device that overcomes the problems with currently known and used convertible portable electronic devices wherein a display screen moves from a closed storage position to a laptop or notebook PC operational position and a tablet PC or touch pad operational position.

It is a general object of the present invention therefore to provide an integrated mechanical design wherein the display screen is moveable from a storage position to a keyboard operational position and tablet operational position that overcomes the problems with the prior art.

It is a further object of the present invention to provide a convertible mobile computing device wherein the display screen is supported at both lower corners and its back over the full range of motion from its closed position through its notebook PC operational position and to its tablet PC operational position.

It is a yet further object of the present invention to provide a convertible mobile computing device wherein the text/graphics information shown on the display screen is continuously presented in the correct viewing orientation when the device is converted from its notebook PC position to its tablet PC position.

SUMMARY OF THE INVENTION

In accordance with a first aspect of the invention, a convertible portable electronic device is presented. The convertible device includes a base unit and a lid. The base unit has a bottom and an oppositely disposed platform operational surface. The lid has means at one end thereof for providing pivotal movement and support between the base unit and the lid for adjusting the angle between the base unit and the lid. The lid pivotal support means is further arranged for slideable engagement with respective corresponding guide means located on the base unit. Web hinge assembly means mechanically couple the lid to the base unit. One end of the web hinge assembly is pivotally coupled to one end region of the base unit and has an opposite end coupled to the lid along a folding pivot axis extending transversely between oppositely disposed side edges of the lid and intermediate the upper end and lower end portions of the lid. The web hinge assembly provides a support point between the base unit and the lid in addition to the support provided by the pivotal support means and the base unit guide means. The guide means may be channels in walls extending upwardly from the operational platform surface or may be channels formed in the operational platform surface.

The lid of convertible portable electronic device includes a viewing side and an oppositely disposed cover side and the viewing side may be a display screen. In its closed position, the lid pivot support means are positioned in the most rearward location in the guide means on the base unit so that the lid is substantially flat and parallel with the base unit operational surface and the viewing side is in a downwardly facing orientation with respect to the base unit operational surface. In its open position, the lid pivot support means are positioned in the most rearward location in the guide means on the base unit and the lid is angled with respect to the base unit operational surface. In its tablet position, the lid pivot support means are positioned in the most forward location in the guide means on the base unit so that the lid is substantially flat and parallel with the base unit operational surface and the viewing side is in an upwardly facing orientation with respect to the base unit operational surface.

The base unit operational surface is further may carry a keyboard for data entry. The display screen may be a stylus input screen. Further, the convertible portable electronic device may be a notebook PC device or a tablet PC device or a webpad device.

In accordance with a further aspect of the invention, a portable electronic computing device includes a base unit and a display screen having means at one end thereof and arranged for slideable engagement and rectilinear movement with respective corresponding guide means located at opposite sides on the base unit for providing a first and second pivotal support point between the base unit and the display screen for adjusting the angle between the base unit and the display screen. A web hinge assembly means has one end pivotally coupled to one end region of the base unit and an opposite end coupled to the display screen along a folding pivot axis extending transversely between opposite sides of the display screen and intermediate the upper end and lower end portions of the display screen for providing a third support point between the base and the display screen.

In accordance with another aspect of the invention, a mobile computing device includes a base unit, and a lid having a display screen carried on one side and a protective cover carried on the side opposite the display screen side. The lid is mechanically coupled to the base unit for movement between a closed position and an open position, which alternately includes a keyboard operation position and a tablet operation position. A web hinge assembly means has one end coupled to a folding pivot axis defined transversely across the lid cover and to a pivot support axis defined transversely across the rear portion of the base unit. The web hinge assembly provides articulated movement of the lid between the closed position and the open keyboard and tablet positions. The lid cover further includes a complementary shaped recess in its surface for receiving and nesting an upper portion of the web hinge assembly coextensive with the lid surface when the lid is in the tablet position. The display screen surface is in a face-to-face relation with an upwardly facing keypad carried by the base unit when the device is in its closed position and is in an upwardly facing orientation when the device is in its open tablet position. The base unit includes means for limiting the rectilinear movement of the lower portion of the display screen between a front portion of the base unit at a rear portion of the base unit. The base unit has a complementary shaped recess in its rear surface for receiving and nesting a lower portion of the web hinge assembly when the lid is in the closed position and in the tablet position.

The web hinge assembly includes an upper web portion which has an outwardly facing surface side and an oppositely disposed inwardly facing surface side wherein the inwardly facing surface side is in face-to-face relation with a lower portion of the complementary shaped lid recess surface when the device is in its closed position and in a face-to-face relation with the upwardly facing keypad when the device is in its tablet position. The web hinge assembly outwardly facing surface side is in a face-to-face relation with an upper portion of the complementary shaped lid recess surface when the device is in its tablet position. The mobile computing device may be a laptop computer or a webpad.

BRIEF DESCRIPTION OF THE DRAWINGS

Other features, benefits and advantages of the present invention will become readily apparent from the following written description taken in conjunction with the drawings wherein.

DETAILED DESCRIPTION OF PREFERRED EMBODIMENTS

Turning now to the drawings and considering the invention in further detail, one exemplary illustration of a portable electronic device embodying the present invention is shown in FIGS. 3–12 as a convertible mobile computing device and is generally designated 200. As illustrated in FIGS, 3–12, the mobile computing device is depicted as convertible between a laptop/notebook PC device and tablet PC or webpad device. The term laptop/notebook PC as used herein refers generically to any of a number of different type computing devices typically having a screen display and a keyboard or other data input entry mechanism as known in the art. The term tablet PC/webpad as used herein refers generically to the class of portable electronic devices having a tablet-like configuration wherein data entry may occur via touch, pen stylus or other input stimulus means such as a touch sensitive screen, co-ordinate intercept screen, or any other suitable screen and input stimulus combination now known or future developed. In one embodiment of the present invention, the display screen is a touch sensitive and responsive screen and functions as an alpha-numeric, graphics and command input means and as an alpha-numeric and graphics display output means for the portable electronic device. That is, graphics, images, text, and the like are displayed for viewing by a user on the display screen in both the laptop PC operational mode and the tablet PC or webpad operational mode. In the webpad operational mode, the user positions the display as explained in further detail hereinbelow, to a writing and viewing position in much the same manner as a sheet of paper would be positioned on a surface for writing or viewing. The display screen may be of any suitable type now known or future developed to carry out the intended viewing function or the intended combination input-output functions.

The convertible mobile computing device 200 includes a base unit 210 in which a keyboard or keypad generally designated 212 is carried on or by the operational surface or platform 220, various sub-assemblies containing electronic components, processor chips, memory, power source for example, a battery, control devices for carrying out the operational features and functions of the mobile computing device and other desirable components and modules now known or future developed for carrying out respective intended functions. The base unit 210 may also include a number of input/output connectors or ports 214 for interfacing with external components such as printers, external mouse device, USB or fire wire connections or other such connections and devices well known to those skilled in the art. The base unit 210 may further include one or more input connector ports 216 for PCMCIA cards which might be used to provide additional functionality for example, wireless network connections, dial-up communications, or other desired features and functions provided by means of such PCMCIA cards or other equivalent connector port/card combination.

Figure 3:
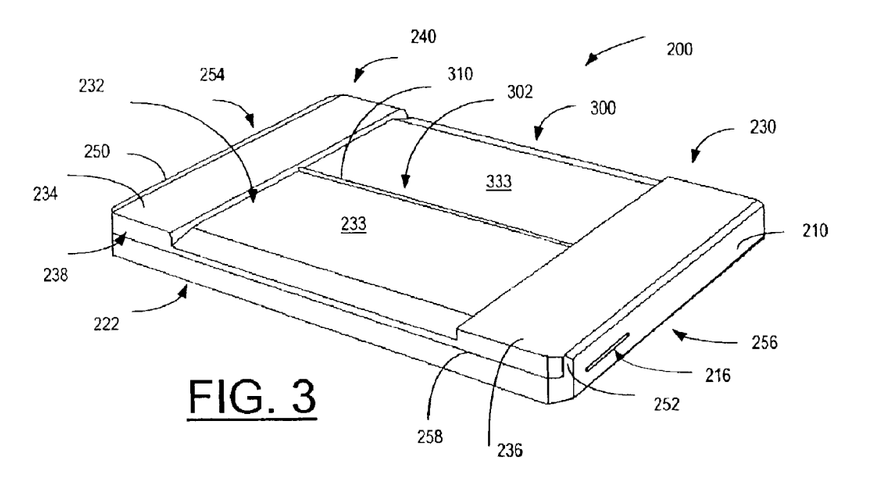
FIG. 3 is a schematic front perspective view of a convertible mobile computing device embodying the present invention showing the device in its closed position.
Figure 4:
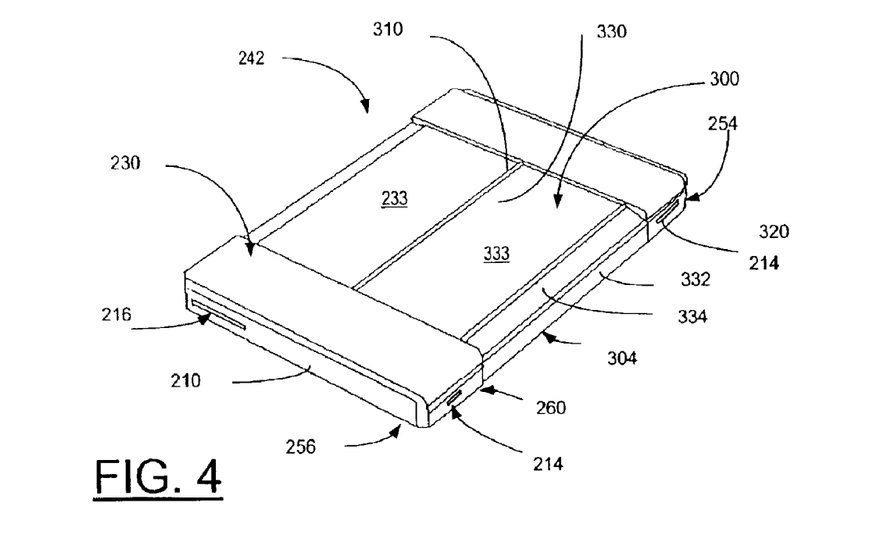
FIG. 4 is a schematic rear perspective view of the convertible mobile computing device illustrated in FIG. 3.

The convertible mobile computing device 200 also includes a lid or cover 230, and as illustrated in the perspective views in FIGS. 3 and 4, the cover is shown in its closed position integral with the base unit 210 for storage and transport. A lock or latch may be utilized as desired to prevent opening the the of the cover or lid 230. The cover 230 further includes a recessed region generally designated 232 between two lateral raised end regions generally designated 234, 236 which extend substantially from the front portion generally designed 238 to the rear portion generally designated 240 of the cover 230. As shown in its closed position in FIGS. 3 and 4, the cover 230 fits or nests between side walls 250, 252 disposed at opposite sides 254, 256 respectively of the base unit 210 and which walls 250, 252 extend generally upward from the plane of the upwardly facing surface 258 of the base unit operational platform 220.

The convertible mobile computing device 200 further includes a web hinge assembly generally designated 300 which is shaped and dimensioned to fit within the recess portion 232 of the cover 230. One end 302 of the web hinge assembly 300 is hinged for pivotal movement about a folding pivot axis generally designated 310 which extends transversely across the width of the recess portion 232 of the cover 230 and is located intermediate the front 238 and rear 240 portions of the cover and substantially mid-way therebetween. The other end 304 of the web hinge assembly 300 is arranged for pivotal rotation about a lower support axis generally designated 320 which axis extends transversely between the sides 254, 256 of the base unit 210 and generally along the lower rear marginal edge 224 of the base unit 210. The web hinge assembly 300 includes a main web portion 330 substantially lying in a first plane, a rear web portion 332 lying in a second plane substantially perpendicular to the first plane and an intermediate web portion 334 between the main web portion 330 and the rear web portion 334 connecting both portions and angling generally downwardly from the main portion 330 to the rear portion 332. It should be noted that the web hinge assembly 300 is preferably a one piece fabricated unit and is geometrically shaped to nest within the recessed surface area 232 of the cover 230 and a recessed area 218 along the rear of the base unit 210. The web hinge assembly 300 is made of a light weight suitable material for example, a stamped metal or a composite material which is sufficiently rigid to prevent twisting or torque along the face surface 333 or between the folding pivot axis 310 and support axis 320. The function of the web hinge assembly 300 will become more apparent during the further description of the invention.

Figure 5:
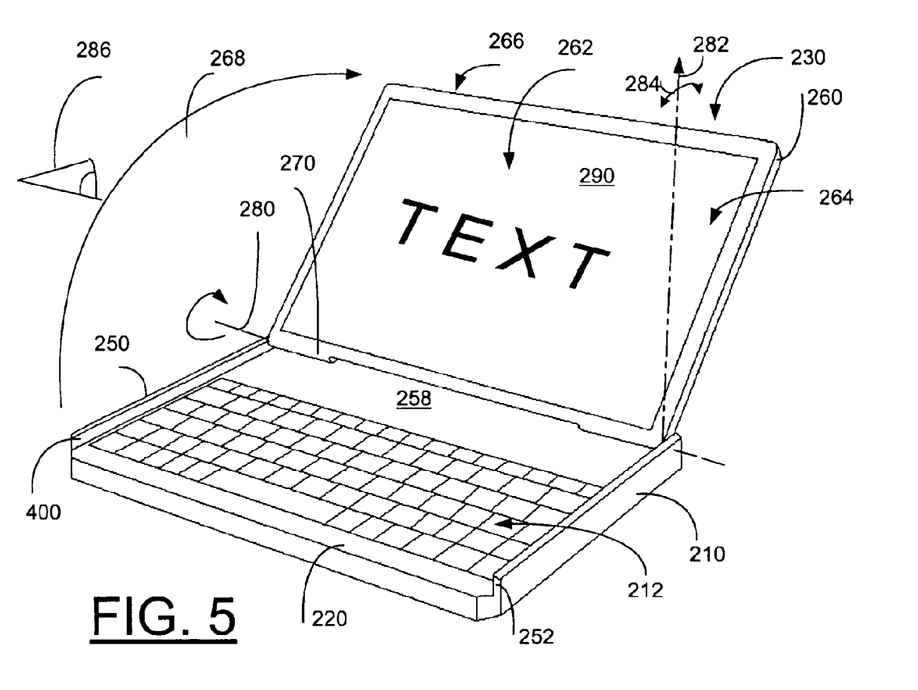
FIG. 5 is a schematic front perspective view of the convertible mobile device showing the device opened to access the keyboard for laptop operation.
Figure 6:
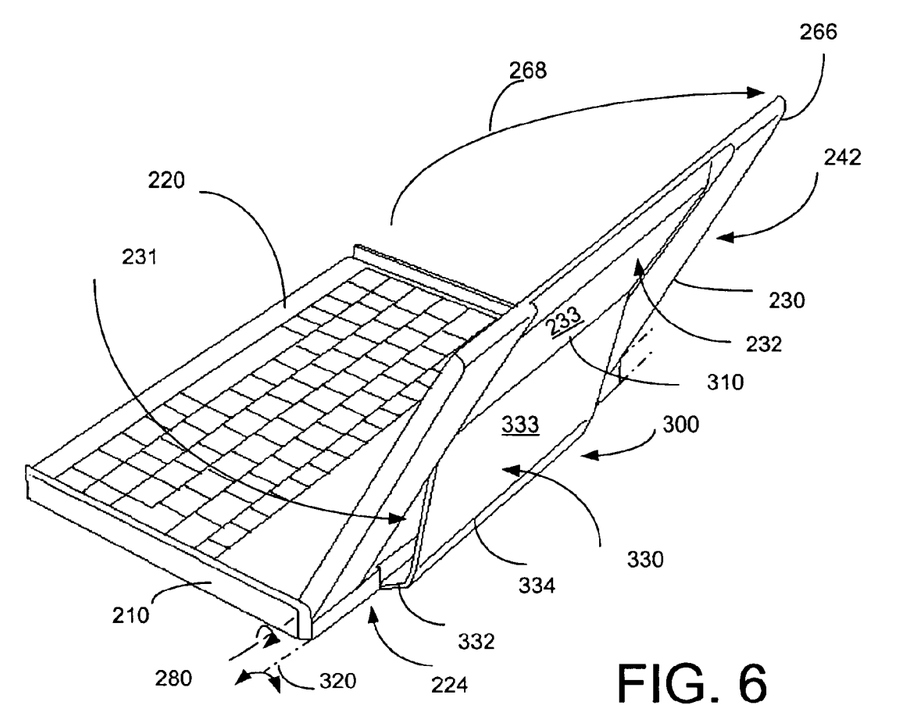
FIG. 6 is a schematic rear perspective view of the convertible mobile device illustrated in FIG. 5.
Figure 7:
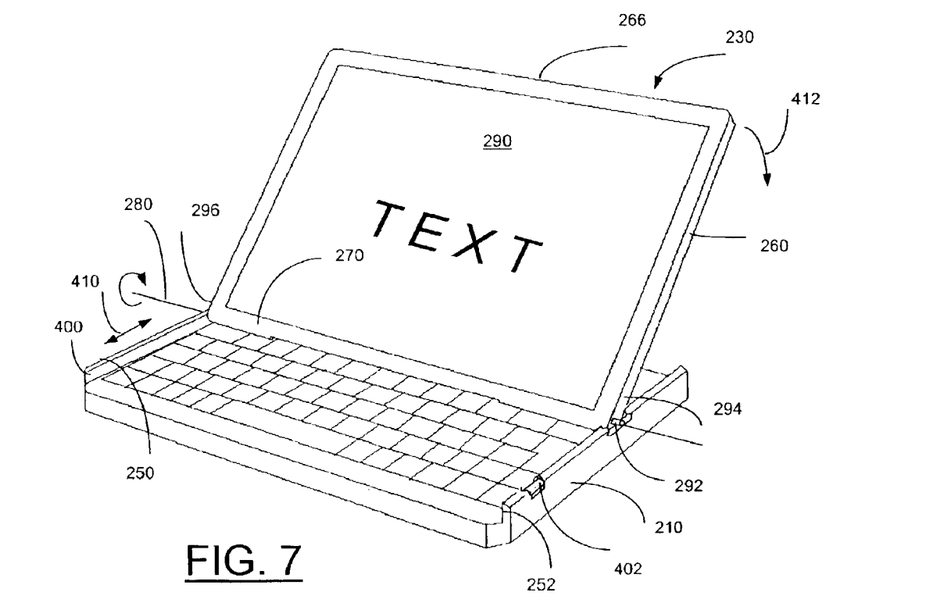
FIG. 7 is a schematic front perspective view of the convertible mobile device illustrating the display and cover as it moves at one point along its movement path from the laptop operating position into the webpad operational position.

In order to operate the mobile computing device 200 in the laptop mode, the cover 230 is pivoted from the device closed position as shown in FIGS. 3 and 4 to its laptop operation open position as illustrated in FIGS. 5 and 6. The cover 230 is generally rectangular in shape although other shapes may obviously be utilized, however, for the illustrated embodiment, a rectangular configuration is shown. The cover 230 includes a frame 260 for carrying a suitable display screen 262 located on the side 264 of the cover 230. It should be noted that the side 264 is in a face-to-face relation with the keyboard 212 carried on the base unit operational platform 220 when the device 200 is in its closed position. The upper end of the display frame 260 is generally designated 266 and follows an arcuate path as indicated by the arcuate direction arrow 268 when the cover 230 is pivoted from the closed position to the open laptop operational position. The cover 230 pivots about the rotation axis 280 which extends transversely across the lower transverse portion 270 of the display frame 260. The plane of the surface 290 of the display screen 262 is continuously variable with respect to a vertical axis 282 to allow positioning of the display screen over a desired range 284 of viewing angles with respect to a viewer generally designated 286 and the surface 25 of the base unit operational platform 220. As shown in FIG. 6, it is seen that the web hinge assembly 300 lifts from its nested position within the recess 232 as the cover 230 pivots about the folding pivot axis 310 and base support axis 320 while supporting the cover 230. As illustrated in FIG. 7, the lower end portion 270 of the display frame 260 is supported for rotation about the axis 280 by means of a suitable pin or projection 292 extending from the display frame 260 at either side 294, 296 of the display frame 260. The pins 292 provide support at both lower sides 294, 296 of the display frame 260 and the web hinge assembly 300 provides support at a third point following along the folding pivot axis 310.

Figure 8:
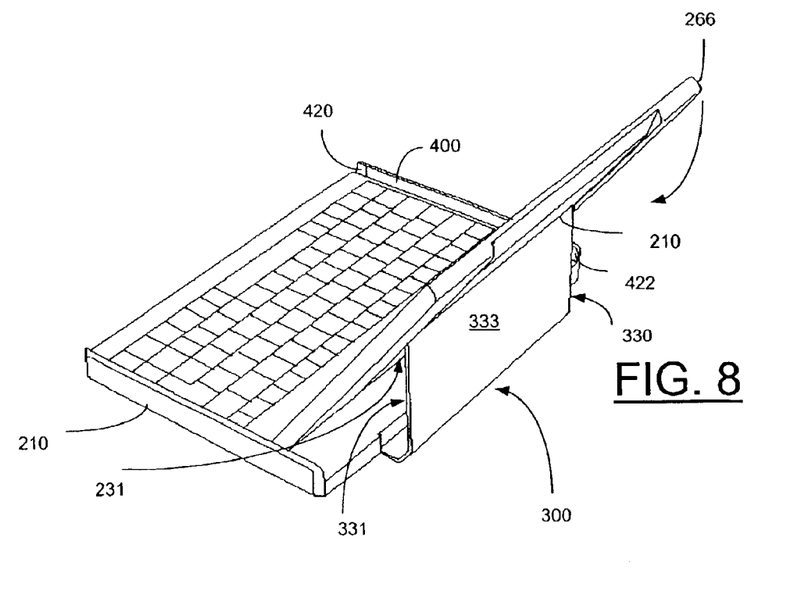
FIG. 8 is a schematic rear perspective view of the convertible mobile device illustrated in FIG. 7 showing the cover rotating about the folding pivot axis between the cover and the web bridging hinge assembly.
Figure 9:
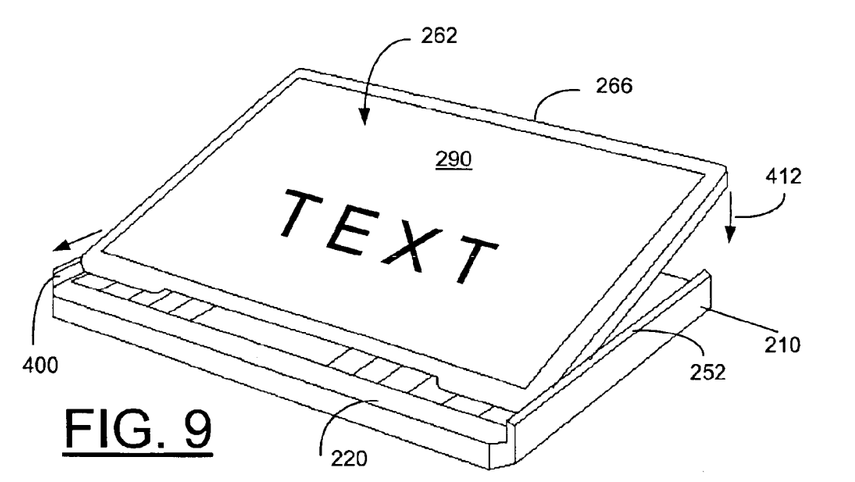
FIG. 9 is a schematic front perspective view of the convertible mobile device illustrating the display and cover as it substantially completes its movement into the webpad operational position.
Figure 10:
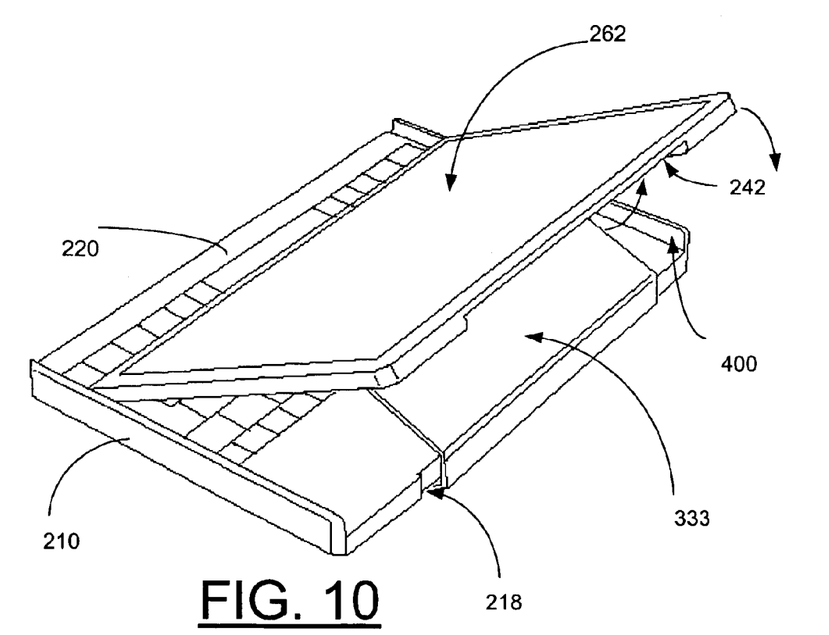
FIG. 10 is a schematic rear perspective view of the convertible mobile device illustrated in FIG. 9.
Figure 11:
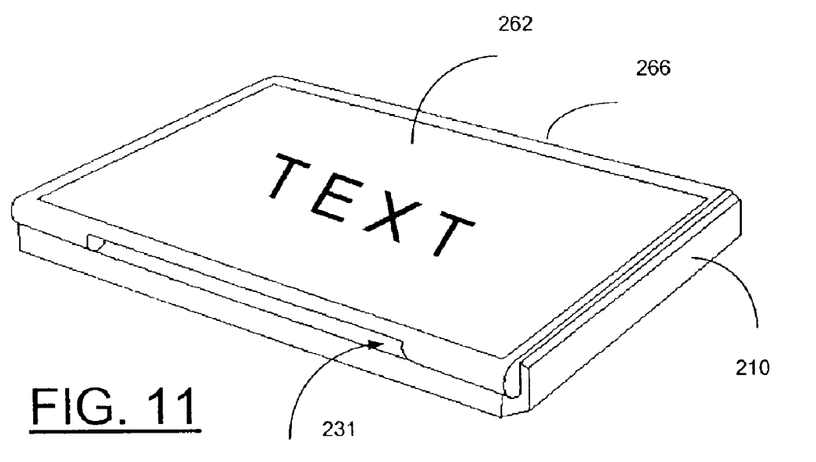
FIG. 11 is a schematic front perspective view of the convertible mobile device in its tablet or webpad operational position.
Figure 12:
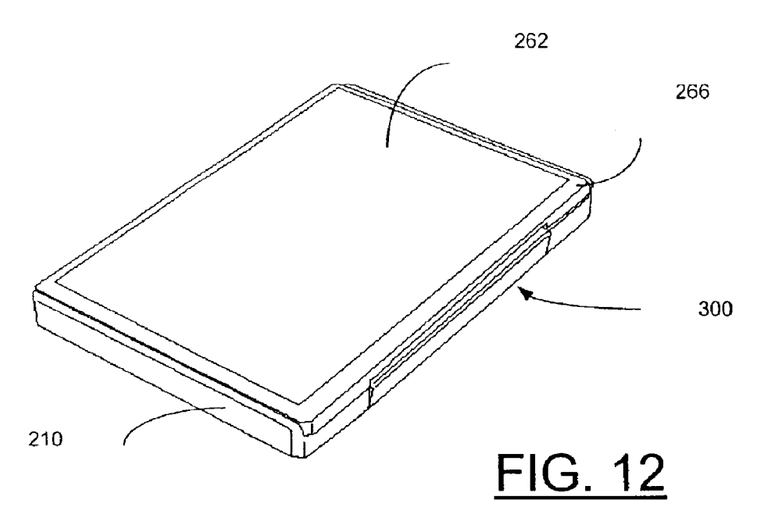
FIG. 12 is a schematic rear perspective view of the convertible mobile device illustrated in FIG. 11.

The convertible mobile computing device 200 embodying the present invention is illustrated in FIGS. 7 and 8 showing the motion of the cover 230 carrying the display frame 260 along its movement path as the cover 230 moves from the laptop PC operational open position into the tablet PC operational position. In addition to providing support and a means for rotation of the cover 230 carrying the display frame 260 about the pivot axis 280, the pins 292 are arranged for co-action with corresponding channel rails or grooves 400, 402 formed in and along the inner surface of walls 250, 252 respectively. The chamber rails 400, 402 cooperate with the pins 292 and provide slideable engagement coupling means between the cover 230 carrying the display frame 260 and the base unit 210 as the lower portion 270 moves along a rectilinear path in the direction indicated by the direction arrow 410 toward the front 222 of the base unit 210. Stops 420, 422 at the front and rear of the channel rails 400 limit movement of the lower portion 270 of the display frame 260 as the cover 230 moves from its closed position to the laptop PC operational position through movement to the tablet PC position. The upper end 266 of the display frame 260 moves downwardly along an arcuate path indicated by the direction arrow 412. As can be seen in FIG. 8, the inner face surface of 331 of the portion 333 of the web hinge assembly 330 moves away from the recessed face surface 231 of the recess 232 in the cover 230. As the cover 230 carrying the display frame 260 continues along its movement path into the tablet PC operational position as illustrated in FIGS. 9 and 10, the outer face surface 333 comes into face-to-face relation with the surface 233 of the upper portion 242 of the recess 232 ultimately nesting in the recess 232 when the cover 230 carrying display frame 260 completes its movement into the tablet PC operational position as illustrated in FIGS. 11 and 12. Thus it can be seen that the web hinge assembly 300 provides continuous support for the cover 230 as the cover moves from a closed position as shown in FIG. 3 to the laptop PC operational position as illustrated in FIG. 5, and throughout its movement into the tablet PC position as illustrated in FIGS. 8 and 10. It will also be appreciated that the nesting configuration of the web hinge assembly 300 with the recess 232 in the cover 230 contributes to a slender profile and an integral design of the convertible mobile computing device 200 from its closed position to its tablet PC position.

It will also be seen and appreciated that the cover 230 of the convertible mobile computing device moves smoothly and freely into, out of and throughout its entire range of motion with stability provided by continuous mechanic support at three points between the cover and the base unit. It will also be appreciated that the cover is not mechanically released from its three coupling points to the base unit at any time during its movement between operational and closed positions.

It will further be seen and appreciated as shown in FIGS. 5, 7, 9 and 11 that text/graphics information shown on the display screen 262 is continuously presented in the correct viewing orientation throughout the display screen's entire range of motion. A viewer continuously observes the term "TEXT" in the normal reading orientation when the device 200 is converted from its notebook PC position as shown in FIG. 5, throughout its range of motion as shown in FIGS. 7 and 9 and finally to its tablet PC position as shown in FIG. 11.

The mechanical design of the convertible portable electronic device embodying the present invention allows the advantageous use of a flat band flexible cable or ribbon cable to provide electrical connections for signals, power and control between the base unit 210 and the display screen 260. The flat cable is routed from the base unit 210 along the surface 331 of the web hinge assembly 300 to the display screen 262 to interconnect the electronic components and modules carried in the base unit to the display screen and any controls carried by the display frame 260.

The display screen/touch sensitive screen as required for webpad operation may be of any suitable type now known or future developed to carry out the intended function. Additionally, control electronics within the base unit 210 condition the display screen output for portrait or landscape orientation as desired to accommodate the orientation of the mobile computing device in its tablet or webpad operational position. Further, the size of the display screen 262 has no theoretical limit but practical limitations imposed on the desired size and weight of the convertible mobile computing device will govern the final size.

Figure 13:
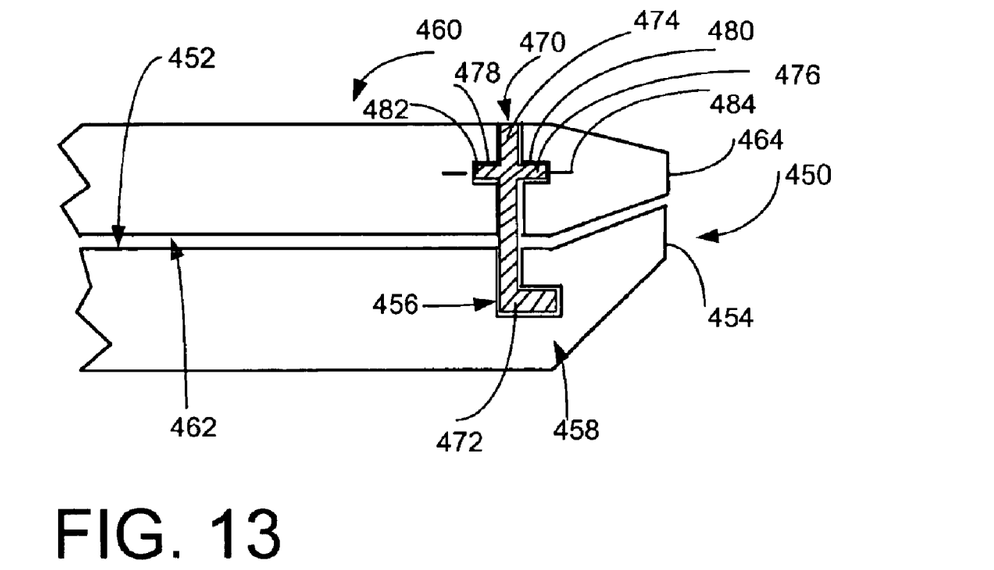
FIG. 13 is a schematic fragmentary cross-sectional view through the support and pivot means and slideable engagement coupling means between the cover and the base unit in an alternate embodiment of the convertible mobile computing device of the present invention.
Figure 14:
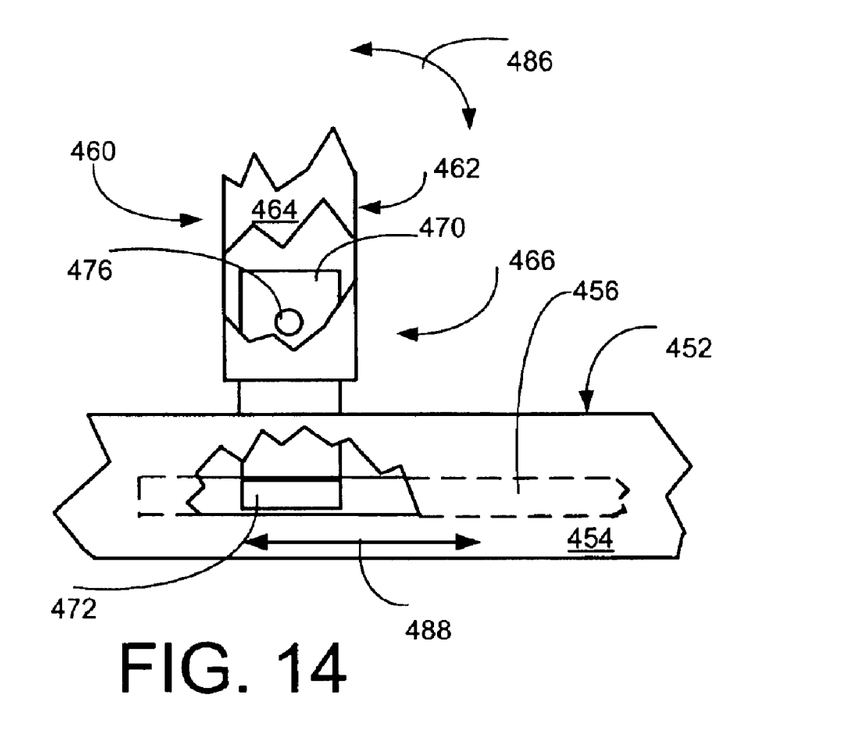
FIG. 14 is a schematic fragmentary cutaway side elevational view showing the support and pivot means and slideable engagement coupling means of FIG. 13.

Alternate arrangements of the means for providing the support and rotation of the cover or lid carrying the display device frame and for providing the slideable engagement coupling between the cover and the base unit of the convertible mobile computing device of the present invention are also contemplated and within the scope of the invention. For example, as shown in the schematic fragmentary cross-sectional view through the support and pivot means and slideable engagement coupling means illustrated in FIG. 13, the base unit generally designated 450 has a somewhat contoured upwardly facing platform operational surface generally designated 452. In this embodiment, the base unit 450 does not have side walls with channels extending upwardly from the surface 452. Although shown somewhat contoured, the base unit surface 452 could be substantially flat or have any other suitable desired surface contouring or shape. A cover or lid generally designated 460 is shown with its display screen side 462 having a shape and size complementary to that of the base unit surface 452. The cover 460 is substantially the same width as the base unit 450 and the side 464 of the cover 460 is substantially flush or even with the side 454 of the base unit. The base unit 450 has an "L" shaped groove or channel generally designated 456 extending lengthwise along the side marginal region 458 of the base unit 450 substantially the length of the side of the base unit to accommodate the rectilinear movement of the base portion 466 of the cover 460 and to accommodate substantially the height from top to bottom of the cover 460 when in the closed or tablet PC position. The channel 456 may be molded as a part of the base unit using techniques well know to those skilled in the molding and fabrication art. The cover 460 is coupled to the base 450 by means of an "L" shaped pivot support member 470. The pivot support member 470 includes a base or foot portion 472 sized and shaped to fit within the "L" shaped groove 456 of the base unit 450. The pivot support member 470 also includes a leg portion 474 extending substantially at a right angle to the foot portion 472 and includes oppositely disposed pins 476, 478 that snap or fit into complementary shaped receiving holes 480, 482 within the cover 460 and along the pivot axis 484. The cover 460 pivots or rotates about the axis 484 in an arcuate direction as indicated by the arrow 486 when the cover 460 is moved from its closed position, to its notebook PC position and to its tablet PC position. The "L" shaped pivot support member 470 may be of any suitable material to carry out the intended function and includes metal, composite or other materials well known to those skilled in the art.

A convertible mobile computing device has been illustrated above in exemplary embodiments to gain an appreciation of the features and benefits of the present invention. Numerous changes and modifications may be made by those skilled in the art, for example, changes in material, the web hinge assembly configuration, and physical configuration without departing from the spirit and scope of the invention. Therefore, the present invention has been described by way of illustration and not limitation.

What is claimed is:

1. A convertible portable electronic device comprising:
    a base unit having a bottom and an oppositely disposed platform operational surface;
    a lid having a viewing side and an oppositely disposed cover side and being mechanically coupled to said base unit;
    a closed position wherein said lid is substantially flat and parallel with said base unit operational surface and said viewing side is in a downwardly facing face-to-face orientation with said base unit operational surface;
    an open position wherein said lid is angled with respect to said base unit operational surface; and
    a tablet position wherein said lid is substantially flat and parallel with said base unit operational surface and said viewing side is in an upwardly facing orientation with respect to said base unit operational surface and said cover side is in a downwardly facing face-to-face orientation with said base unit operational surface;
    said lid having means at one end thereof for providing pivotal movement and support between said base unit and said lid for movement between said closed position, said open position and said tablet position, said lid pivotal support means further being arranged for slideable engagement with respective corresponding guide means located on said base unit, and
    web hinge assembly means having one end pivotally coupled to one end region of said base unit and an opposite end coupled to said lid along a folding pivot axis extending transversely between oppositely disposed side edges of said lid and intermediate the upper end and lower end portions of said lid, said web hinge assembly providing a further support point between said base unit and said lid.

2. The convertible portable electronic device as set forth in claim 1 wherein said viewing side is further characterized by a display screen.

3. The convertible portable electronic device as set forth in claim 1 wherein in said closed position said lid pivot support means are positioned in the most rearward location in said guide means on said base unit.

4. The convertible portable electronic device as set forth in claim 1 wherein in said open position said lid pivot support means are positioned in the most rearward location in said guide means on said base unit.

5. The convertible portable electronic device as set forth in claim 1 wherein in said tablet position said lid pivot support means are positioned in the most forward location in said guide means on said base unit so that the lid is substantially flat and parallel with the base unit operational surface and the viewing side is in an upwardly facing orientation with respect to said base unit operational surface.

6. The convertible portable electronic device as set forth in claim 1 wherein said guide means further comprise channels located along each respective side marginal region to define a linear path along which said lid pivotal support means slideably moves with a rectilinear movement.

7. The convertible portable electronic device as set forth in claim 6 wherein said channels further include grooves in walls extending upwardly from said platform operational surface.

8. The convertible portable electronic device as set forth in claim 6 wherein said channels further include grooves formed in said platform operational surface.

9. The convertible portable electronic device as set forth in claim 1 wherein said base unit operational surface is further characterized by a keyboard.

10. The convertible portable electronic device as set forth in claim 2 wherein said display screen is further characterized by a stylus input screen.

11. The convertible portable electronic device as set forth in claim 1 further characterized in that said portable electronic device is a notebook PC device.

12. The convertible portable electronic device as set forth in claim 1 further characterized in that said portable electronic device is a tablet PC device.

13. The convertible portable electronic device as set forth in claim 1 further characterized in that said portable electronic device is a webpad device.

14. A portable electronic computing device characterized by:
    a base unit;
    a display screen having means at one end thereof and arranged for slideable engagement with respective corresponding guide means located at opposite sides on said base unit for providing a first and second pivotal support point between said base unit and said display screen for movement between a closed position wherein said display screen is substantially flat and parallel with said base unit and in a downwardly facing face-to-face orientation with said base unit, a tablet position wherein said display screen is substantially flat and parallel with said base unit and in an upwardly facing orientation with respect to said base unit, and an open position wherein said display screen is angled with respect to said base unit and the angle between said base unit and said display screen being adjustable, said slideable engagement means and said guide means further being arranged for rectilinear movement with respect to one another, and web hinge assembly means having one end pivotally coupled to one end region of said base unit and an opposite end coupled to the display screen along a folding pivot axis extending transversely between opposite sides of the display screen and intermediate the upper end and lower end portions of the display screen for providing a third support point between said base and said display screen.

15. A mobile computing device characterized by:

a base unit;

a lid having a display screen carried on one side and a protective cover carried on the side opposite the display screen side, said lid being mechanically coupled to said base unit for movement between a closed position in which said display screen side is in a downwardly facing orientation with respect to said base unit and said protective cover is in an upwardly facing orientation with respect to said base unit and an open position, said open position including a keyboard operation position in which said display screen side is in an angled orientation with respect to said base unit and a tablet operation position in which said display screen side is in an upwardly facing orientation with respect to said base unit and said protective cover is in a downwardly facing orientation with respect to said base unit, and web hinge assembly means having one end coupled to a folding pivot axis defined transversely across said lid cover and to a pivot support axis defined transversely across the rear portion of said base unit, said web hinge assembly providing articulated movement of said lid between said closed position and said open keyboard and tablet positions, said lid cover further including a complementary shaped recess in its surface for receiving and nesting an upper portion of the web hinge assembly coextensive with the lid surface when said lid is in said tablet position and said closed position.

16. The mobile computing device as set forth in claim 15 further characterized by said display screen surface being in a face-to-face relation with an upwardly facing keypad carried by said base unit when said device is in its closed position and being in an upwardly facing orientation when said device is in its open tablet position.

17. The mobile computing device as set forth in claim 15 wherein said base unit is further characterized by means for limiting the rectilinear movement of the lower portion of the display screen between a front portion of the base unit at a rear portion of the base unit.

18. The mobile computing device as set forth in claim 15 further characterized in that said base unit has a complementary shaped recess in its rear surface for receiving and nesting a lower portion of the web hinge assembly when said lid is in said closed position and said tablet position.

19. The mobile computing device as set forth in claim 16 further characterized in that said web hinge assembly includes an upper web portion having an outwardly facing surface side and an oppositely disposed inwardly facing surface side wherein said inwardly facing surface side is in face-to-face relation with a lower portion of said complementary shaped lid recess surface when said device is in its closed position and in face-to-face relation with the upwardly facing keypad when said device is in its tablet position.

20. The mobile computing device as set forth in claim 19 further characterized in that said web hinge assembly outwardly facing surface side is in a face-to-face relation with an upper portion of said complementary shaped lid recess surface when said device is in its tablet position.

21. The mobile computing device as set forth in claim 15 further characterized by a laptop computer.

22. The mobile computing device as set forth in claim 15 further characterized by a webpad.

* * * * *

UNITED STATES PATENT AND TRADEMARK OFFICE
CERTIFICATE OF CORRECTION

PATENT NO. : 6,903,927 B2
DATED : June 7, 2005
INVENTOR(S) : Marcus Anlauff

It is certified that error appears in the above-identified patent and that said Letters Patent is hereby corrected as shown below:

Column 10,
Line 2, after "wherein" "-" should be deleted.

Signed and Sealed this

Ninth Day of August, 2005

JON W. DUDAS
*Director of the United States Patent and Trademark Office*